United States Patent [19]
Sumiya

[11] Patent Number: 5,340,780
[45] Date of Patent: Aug. 23, 1994

[54] CUBIC BORON NITRIDE SINTERED COMPACT AND METHOD OF PREPARING THE COMPACT

[75] Inventor: Hitoshi Sumiya, Hyogo, Japan
[73] Assignee: Sumitomo Electric Industries, Ltd., Osaka, Japan
[21] Appl. No.: 827,579
[22] Filed: Jan. 28, 1992

Related U.S. Application Data

[63] Continuation of Ser. No. 551,435, Jul. 10, 1990, abandoned.

[30] Foreign Application Priority Data

Jul. 11, 1989 [JP] Japan ............................. 1-179728

[51] Int. Cl.$^5$ .............................................. C04B 35/58
[52] U.S. Cl. .......................................................... 501/96
[58] Field of Search ............................ 501/96, 97, 98; 423/290; 75/238

[56] References Cited

U.S. PATENT DOCUMENTS

| | | | |
|---|---|---|---|
| 4,016,244 | 4/1977 | Susa et al. | 423/290 |
| 4,188,194 | 2/1980 | Corrigan | 51/301 |
| 4,334,928 | 6/1982 | Hara et al. | 75/238 |
| 4,469,802 | 9/1984 | Endo et al. | 423/290 |
| 4,562,163 | 12/1985 | Endo et al. | 423/290 |
| 4,772,575 | 9/1988 | Ota et al. | 501/96 |

FOREIGN PATENT DOCUMENTS 0240913 10/1987 European Pat. Off. .

OTHER PUBLICATIONS

Material Research Bulletin, vol. 7, (1972), pp. 999 to 1004, article entitled: "Synthesis of Polycrystalline Cubic BN", by Wakatsuki et al.

Primary Examiner—Mark L. Bell
Assistant Examiner—A. Wright
Attorney, Agent, or Firm—W. G. Fasse; W. F. Fasse

[57] ABSTRACT

A cubic boron nitride sintered compact is produced by adding to atmospheric pressure type boron nitride, a cubic boron nitride synthetic catalyst and 0.01 to 5.0 percent by weight of a hydroxide of an alkaline earth metal to form a mixture. Then, the mixture is subjected to a high temperature/high pressure treatment under a thermodynamically stable pressure condition for cubic boron nitride, whereby the atmospheric pressure type boron nitride is converted to cubic boron nitride under the action of the cubic boron nitride synthetic catalyst. The cubic boron nitride sintered compact thus obtained contains 0.01 to 5.0 percent by weight of an oxide of the alkaline earth metal only in triple points between the cubic boron nitride grains. The cubic boron nitride grains are densely bonded with each other.

8 Claims, 1 Drawing Sheet

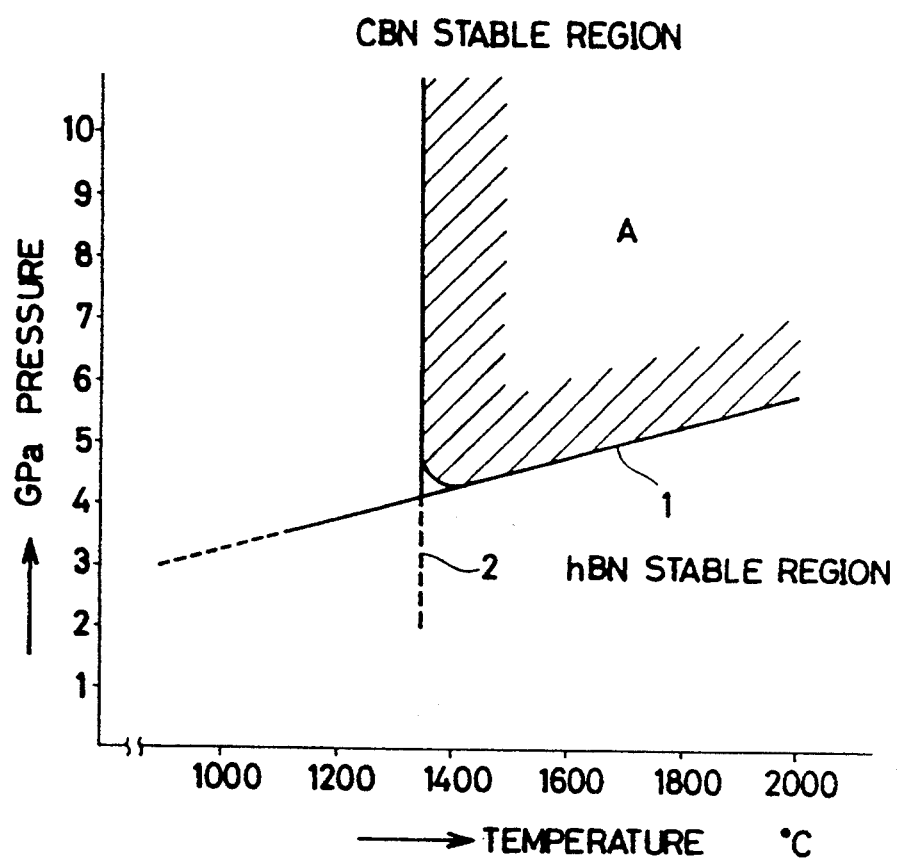

CUBIC BORON NITRIDE SINTERED COMPACT AND METHOD OF PREPARING THE COMPACT

This application is a continuation of application Ser. No. 07/551,435, filed on Jul. 10, 1990 now abandoned.

FIELD OF THE INVENTION

The present invention relates to a cubic boron nitride sintered compact which is applied in a cutting tool, or as a heat sink material for a semiconductor laser or an LSI, for example, and a method of preparing such a compact.

BACKGROUND INFORMATION

Cubic boron nitride, hereinafter referred to as cBN, is generally employed as a material for a cutting tool, since the same is the hardest material next to diamond and has extremely stable thermal and chemical properties. Further, cBN has an excellent thermal conductivity even compared to diamond, and it is expected that it will be used as a heat sink or radiation substrate for a semiconductor laser or the like. However, it is extremely difficult to make a large-sized single crystal of cBN, and hence a sintered compact formed of cBN grains of several micrometers is considered to be a practicable material.

Since it is extremely difficult to directly sinter cBN grains or powder independently, a metal such as Al or Co, or a carbide such as TiC, or a nitride such as TiN is generally employed as a binder for sintering the cBN grains. In a cBN sintered compact containing the aforementioned binder, however, the binder defines a continuous phase among the cBN grains, and hence the hardness and thermal conductivity of the sintered compact are significantly reduced so that it is difficult to satisfactorily obtain the excellent properties originally provided by the cBN.

Japanese Patent Laying-Open No. 54-33510 or Material Research Bulletin, Vol. 7 (1972), pp. 999 to 1004 discloses a first known method of making a cBN sintered compact not containing any binder with a starting material of atmospheric pressure type BN, hexagonal boron nitride: hereinafter referred to as hBN, by directly converting hBN to cBN under superhigh pressure/temperature conditions of 6.5 GPa at least 1800° C. and simultaneously sintering the same. However, such a method of making a cBN sintered compact by direct conversion requires extremely high pressure/high temperature conditions. Even if these conditions are satisfied, the known method is insufficient in its reproducibility, so that it is not suitable for industrial production.

On the other hand, each of Japanese Patent Laying-Open Nos. 58-176179 and 59-57967, Japanese Patent Publication Nos. 59-5547 and 60-28782, discloses a further known method for producing a cBN sintered compact under relatively low pressure/temperature conditions as compared with the aforementioned direct conversion method and with an excellent reproducibility. According to the further method, a small quantity of alkaline earth metal boron nitride is added to or diffused/contained in the hBN powder or in a sintered compact thereof, which is treated under a thermodynamically stable pressure condition for hBN at a temperature exceeding 1350° C. The further method is adapted to convert hBN to cBN with a catalyst of the alkaline earth metal boron nitride while bonding the cBN grains with each other simultaneously with such conversion. It is said that, according to the further method, the material can be treated at a temperature exceeding 1350° C., which is the eutectic temperature of the alkaline earth metal boron nitride and hBN, to obtain a strong sintered compact which is formed of only cBN grains of 3 to 10 μm in unit grain diameter and substantially not containing any impurity.

U.S. Pat. No. 4,772,575 (Ota et al.) discloses a third method of producing a cBN sintered compact using alkaline earth metal boron nitride as a catalyst. In the third method disclosed in U.S. Pat. No. 4,772,575, a sintered compact of cubic boron nitride is made by adsorbing and/or diffusing 0.005 to 1.000 percent by weight of water into a boron nitride compact containing alkaline earth metal boron nitride as a catalyst.

The present inventor has experimentally produced a cBN sintered compact by the method disclosed in said U.S. Pat. No. 4,772,575 using the alkaline earth metal boron nitride as a catalyst, and made a cutting test with the so-formed sintered compact. As the result, it has been recognized that the so obtained cBN sintered compact was extremely worn since cBN grains fell out of the grain bond and transgranular rupture occurred, so that the expected performance was not attained. The maximum thermal conductivity of said cBN sintered compact was 6 W/cm.°C., which is twice or three times better than that of BeO (beryllium oxide) or AlN (aluminum nitride) generally used as a heat sink material. However, it has also been recognized that said cBN sintered compact had a rather largely dispersed thermal conductivity, which is the most important basic property of a heat sink material.

In order to solve this problem, the inventor has studied the cBN sintered compact obtained by the method disclosed in said U.S. Pat. No. 4,772,575 (Ota et al.), to recognize that unit grains forming said cBN sintered compact were irregular and this disadvantage even increased as abnormal grain growth was increased. Such irregularity of the grains easily leads to falling of the grains out of the grain structure and transgranular rupture (cleavage), to reduce the wear resistance and strength (toughness) of the sintered compact. Further, the density of the sintered compact is relatively low, whereby phonon scattering is increased at the grain boundaries and the thermal conductivity is reduced.

The method of U.S. Pat. No. 4,772,575 uses the alkaline earth metal boron nitride as a catalyst for converting hBN to cBN in a eutectic state with BN, and hence states for the generation of cBN cores and the following growth of cBN crystal grains vary significantly with the dispersed state of the catalyst, with the treatment temperature and even with small pressure variations. According to said method, therefore, an abnormal grain growth of cBN grains easily takes place at least partly and hence it is extremely difficult to control the configurations and sizes of the grains.

SUMMARY OF THE INVENTION

It is an object of the present invention to provide a cBN sintered compact having a dense and homogeneous structure, which is suitable as a material for a cutting tool or a heat sink, by controlling the sizes and configurations of cBN grains.

The present method of producing a cBN sintered compact comprises the steps of:

(1) adding a cBN synthetic catalyst to atmospheric pressure type boron nitride as a starting material which is selected from the group listed below and further adding 0.01 to 5.0 percent by weight of a hydroxide of an alkaline earth metal to the raw material or starting material boron nitride; and (2) performing a high temperature/high pressure treatment on the raw or starting material under a thermodynamically stable pressure condition for cBN at a temperature exceeding a level capable of converting the starting material type boron nitride to cBN under the catalytic action of the cBN synthetic catalyst.

The so-formed cBN sintered compact contains 0.01 to 5.0 percent by weight of an oxide of the alkaline earth metal, and the cBN grains are contacted with each other directly at their interface. The present cBN sintered compact is particularly characterized in that the oxide of the alkaline earth metal is interspersed among the triple points of the cBN grains.

The above mentioned atmospheric pressure type boron nitride, serving as a raw material or starting material, is generally selected from the group of normal boron nitride, rhombohedral boron nitride (rBN), amorphous boron nitride (aBN) or pyrolytic boron nitride (pBN). The purity of the raw material must be as high as possible, while the content of $B_2O_3$, in particular, is preferably not more than 0.3 percent by weight, so that the same will not prevent the conversion of the starting material to cBN.

The cBN synthetic catalyst may be prepared from a well-known material, preferably from an alkali metal boron nitride or an alkaline earth metal boron nitride. The content of the catalyst is within a range of 0.01 to 5.0 mole percent with respect to the raw material or starting material type boron nitride. If the content of the catalyst is not more than 0.01 mole percent, conversion of hBN to cBN is not sufficiently promoted. If the content exceeds 5.0 mole percent, on the other hand, a large quantity of the catalyst is left in the cBN sintered body whereby the mechanical properties and the thermal conductivity of the cBN sintered compact are substantially reduced.

A hydroxide $(Me(OH)_2)$ of an alkaline earth metal such as $Mg(OH)_2$ or $Ca(OH)_2$, for example, is added in order to suppress an abnormal grain growth of cBN. The content of such an admixture is within a range of 0.01 to 5.0 percent by weight with respect to the raw material or the starting material boron nitride. A sufficient effect cannot be attained unless the content of the admixture is at least 0.01 percent by weight, while a large quantity of oxide of the alkaline earth metal such as MgO or CaO, for example, is left in the cBN sintered compact if the content exceeds 5.0 percent by weight, whereby the mechanical performance and thermal conductivity of the cBN sintered body would be reduced.

The mixture of the aforementioned starting material boron nitride with the cBN synthetic catalyst and with the hydroxide of the alkaline earth metal, is treated in a high temperature and high pressure generator under a thermodynamically stable pressure condition for cBN at a temperature exceeding a level capable of converting the starting material boron nitride to cBN with action of the cBN synthetic catalyst, such as a temperature exceeding 1350° C. if the cBN synthetic catalyst is magnesium boron nitride, for example.

The single Fig. is a graph showing an hBN-cBN thermal equilibrium curve, wherein a cBN stable region appears above line 1 and an hBN stable region appears under line 1, while numeral 2 denotes a eutectic line of the magnesium boron nitride and boron nitride (BN). Therefore, the high temperature, high pressure treatment is performed in a region A shown in the Fig. at a temperature exceeding 1350° C. and at a pressure of at least about 4.2 GPa.

The starting material boron nitride is converted to cubic boron nitride (cBN) by the aforementioned treatment, simultaneously with the sintering of the cBN grains. During the treatment, the alkaline earth metal hydroxide $(Me(OH)_2$, Me: alkaline earth metal) added to the raw material is decomposed into an oxide (MeO) of the alkaline earth metal. The so produced MeO blocks floating of eutectic materials to suppress an abnormal grain growth of the cBN.

Further, the MeO is not left in the boundaries between cBN grains but interspersed among triple points. In the so-formed cBN sintered compact, therefore, all cBN grains are continuously bonded with each other so that characteristics such as hardness and thermal conductivity are not influenced by the residual MeO. Further, the present cBN sintered compact is dense and has a uniform grain diameter.

As hereinabove described in detail, the present invention obtains a cBN sintered compact by adding a cBN synthetic catalyst and a hydroxide of an alkaline earth metal to a starting material type boron nitride and treating the same under high pressure/high temperature conditions. According to the present invention, it is possible to obtain a cBN sintered compact which has a dense and homogeneous structure with strongly bonded cBN grains by simply adding the hydroxide of the alkaline earth metal to the raw material, dissimilarly to the conventional methods. The so-formed cBN sintered compact, which has mechanical properties superior to those of conventional ones, can be used in a cutting tool and the like. Further, the cBN sintered compact has such high thermal conductivity that the same is optimal as a heat sink material.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a graph showing the temperature-pressure equilibrium in the case when magnesium boronitride is used as a cBN synthetic catalyst, for illustrating a region capable of forming or producing a cBN sintered compact according to the present invention.

DESCRIPTION OF THE PREFERRED EMBODIMENTS

Example 1

Powder of hBN containing 0.2 percent by weight of $B_2O_3$, powder of magnesium boron nitride $(Mg_3BN_2)$ and magnesium hydroxide $(Mg(OH)_2$ were sufficiently mixed in a nitrogen gas in the ratios 95.5:4:0.5 in weight percentages. In this case, the content of magnesium boron nitride with respect to hBN was about 1 mole percent.

This mixture was compacted in a girdle type high temperature and high pressure generator under pressure and temperature conditions of 5.5 GPa and 1500° C., and then quenched and the product taken out.

The sample formed as above was a strong gray sintered compact. It has been proven by X-ray diffraction that this sample was a cBN sintered compact, in which a small quantity of MgO and an extremely small trace quantity of $Mg_3BN_3$ of the high-pressure phase type were detected. The surface of this cBN sintered compact was observed with a scanner type electron microscope (SEM) whereby it was noticed that the cBN grains having relatively uniform grain diameters of 5 to 8 µm, were continuously bonded in a dense structure. The compact was further observed with a transmission type electron microscope (TEM) and it was noticed that MgO was interspersed among only triple points of the cBN grains.

The thermal conductivity and Vickers hardness of the aforementioned sintered compact was measured at room temperature, whereby high values of 6.5 W/cm.°C. and 6000 to 6500 kg/mm$^2$ respectively, were measured.

For the purpose of comparison, 1 mole percent of Mg$_3$BN$_3$ powder was added to hBN powder, and the mixture was subjected to a high temperature and high pressure treatment under the same conditions as above with no addition of Mg(OH)$_2$, to produce a cBN sintered compact. The structure of the cBN sintered compact produced for comparing was observed with a scanner type electron microscope (SEM), whereby it was noted that the cBN grains had rather irregular grain diameters of 3 to 10 µm although the grains were bonded with each other, while coarse grains having diameters of 20 to 30 µm were also observed to be present to some extent. The thermal conductivity and Vickers hardness of this sample were 5.3 W/cm.°C. and 5000 to 6500 kg/mm$^2$ respectively. These values are mostly lower than the respective values of the sample according to the invention.

Example 2

Similarly to Example 1, 1 mole percent of Mg$_3$BN$_3$ and 1.2 percent by weight of Mg(OH)$_2$ were added to hBN powder and a mixture formed which was subjected to a high pressure and high temperature treatment for 30 minutes under pressure and temperature conditions of 5.0 GPa and 1400° C., to obtain a sintered compact.

This sintered compact had an extremely dense and homogeneous structure, which was formed of fine cBN grains of about 1 µm in diameter. Although this sintered compact exhibited a rather low thermal conductivity of 4.5 W/cm.°C., its Vickers hardness was at a high value of 6500 kg/mm$^2$. This sintered compact was cut with a laser, to produce a cutting tool.

For the purpose of comparison, a cutting tool of the same configuration was made of a commercially available cBN sintered compact which was produced by bonding cBN grains having a mean grain size of 3 µm, with a binder mainly formed of TiN. The comparison cBN sintered compact contained about 30 percent by volume of the binder.

The aforementioned cutting tools were subjected to a cutting test by cutting members of gray cast iron (FC25) under the same conditions namely a cutting speed of 500 m/min., a depth of cut of 0.2 mm, and a feed rate of 0.1 mm/rev.

The cutting tool made of the sintered compact according to the invention was capable of performing a cutting operation for 40 minutes before a wear width at its tip flank reached 0.1 mm. In the comparison cutting tool, on the other hand, the flank wear width reached 0.1 mm at cutting for about 15 minutes.

Example 3

Similarly to Example 1, 1.2 mole percent of calcium boron nitride and 1.0 percent by weight of Ca(OH)$_2$ were added to hBN powder, and the mixture was subjected to a high pressure and high temperature treatment for 30 minutes under pressure and temperature conditions of 5.5 GPa and 1450° C.

The so-formed cBN sintered compact exhibited regular unit grain diameters of 5 to 8 µm, and the cBN grains were strongly bonded with each other. Further, CaO was homogeneously interspersed among triple points of the cBN grains. This sintered compact had a high thermal conductivity and Vickers hardness of 6.0 W/cm.°C. and 5000 to 6500 kg/mm$^2$, respectively.

For the purpose of comparison, a cBN sintered compact was produced under the same conditions as above with no addition of Ca(OH)$_2$. This cBN sintered compact exhibited irregular grain diameters of 5 to 30 µm and fine cracks were partially observed in the sintered compact, while the thermal conductivity and hardness were so inferior that the same were not worth measuring.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cubic boron nitride sintered compact comprising cubic boron nitride grains contacted with each other directly at their interfaces, and 0.01 to 5.0% by weight of a solid oxide of an alkaline earth metal in said sintered compact.

2. The cubic boron nitride sintered compact of claim 1, wherein said cubic boron nitride grains form triple points where three neighboring cubic boron nitride grains contact each other to form spaces at said triple points, said solid oxide of said alkaline earth metal being present only in said spaces at said triple points.

3. The cubic boron nitride sintered compact of claim 1, wherein said cubic boron nitride grains have grain diameters of 8 µm at the most, wherein a difference between maximum and minimum grain diameters is not more than 3 µm, wherein a thermal conductivity of said cubic boron nitride sintered compact is within a range of 4.5 to 6.5 W/cm.°C., and wherein a Vickers hardness of said cubic boron nitride sintered compact is within a range of 5000 to 6500 kg/mm$^2$.

4. A cubic boron nitride sintered compact comprising cubic boron nitride grains having grain diameters of 8 µm at the most, said grains being contacted to each other directly at their interfaces, wherein a difference between maximum and minimum grain diameters is not more than 3 µm, said sintered compact further comprising 0.01 to 5.0% by weight of an oxide of an alkaline earth metal present only in spaces formed at triple points where three neighboring cubic boron nitride grains contact each other.

5. A method of producing a cubic boron nitride sintered compact directly from a powder mixture of a starting material selected from the group consisting of hexagonal, rhombohedral, amorphous, and pyrolytic boron nitride powder comprising the following steps:

(a) forming a powder mixture by adding to said starting material boron nitride powder at least one synthetic catalyst selected from the group consisting of an alkaline earth metal boron nitride and an alkali metal boron nitride powder, (b) further adding to said starting material boron nitride powder, 0.01 to 5.0% by weight of a hydroxide of an alkaline earth metal, and (c) applying to said powder mixture a high temperature and high pressure treatment at a high pressure of at least 4.2 GPa and at a high temperature exceeding 1,350° C. for converting said powder mixture into said cubic boron nitride sintered compact, whereby conversion and sintering take place in the same operation.

6. The method of claim 5, wherein an added amount of said synthetic catalyst to said starting material boron nitride powder is within a range of 0.01 to 5.0 mole %.

7. The method of claim 5, wherein said synthetic catalyst is selected from the group consisting of magnesium boron nitride and calcium boron nitride, and wherein said hydroxide of an alkaline earth metal is selected from the group consisting of $Mg(OH)_2$ and $Ca(OH)_2$.

8. A method of producing a cubic boron nitride sintered compact directly from a powder mixture of a starting material selected from the group consisting of hexagonal, rhombohedral, amorphous, and pyrolytic boron nitride powder containing not more than 0.3% by weight of $B_2O_3$, comprising the steps of:

(a) forming a powder mixture by adding to said starting material boron nitride powder, at least one synthetic catalyst selected from the group consisting of an alkaline earth metal boron nitride and an alkali metal boron nitride within a range of 0.01 to 5.0 mole % with respect to said starting material boron nitride powder;

(b) adding a hydroxide of an alkaline earth metal to said starting material boron nitride powder within a range of 0.01 to 5.0% by weight with respect to said starting material boron nitride powder; and (c) performing on said powder mixture a high temperature and high pressure treatment at a high pressure of at least 4.2 GPa and at a high temperature exceeding 1,350° C. for converting said starting material boron nitride powder into cubic boron nitride under the catalytic action of said synthetic catalyst to form said cubic boron nitride sintered compact, whereby conversion and sintering take place in the same operation.

* * * * *

UNITED STATES PATENT AND TRADEMARK OFFICE
CERTIFICATE OF CORRECTION

PATENT NO. : 5,340,780
DATED : August 23, 1994
INVENTOR(S) : Hitoshi Sumiya

It is certified that error appears in the above-indentified patent and that said Letters Patent is hereby corrected as shown below:

Column 4, line 54, replace "$(Mg_3BN_2)$" by --$(Mg_3BN_3)$--.

Column 8, line 4, replace "a powder" by --said powder--.

Signed and Sealed this

Eighth Day of November, 1994

Attest:

BRUCE LEHMAN

Attesting Officer     Commissioner of Patents and Trademarks